United States Patent [19] [11] Patent Number: 6,062,353
Asai et al. [45] Date of Patent: May 16, 2000

[54] DRUM BRAKE DEVICE

[75] Inventors: Seiji Asai, Okazaki; Yasushi Kobayashi, Nagoya, both of Japan

[73] Assignee: Nisshinbo Industries, Inc., Tokyo, Japan

[21] Appl. No.: 08/965,857

[22] Filed: Nov. 7, 1997

[30] Foreign Application Priority Data

Nov. 13, 1996 [JP] Japan ................................. 8-317038

[51] Int. Cl.⁷ ................................................. F16D 51/00
[52] U.S. Cl. ........................... 188/325; 188/341; 188/328
[58] Field of Search ................................. 188/325–341

[56] References Cited

U.S. PATENT DOCUMENTS

| | | | |
|---|---|---|---|
| 3,973,655 | 8/1976 | Mollard | 188/328 |
| 4,678,067 | 7/1987 | Thompson. | |
| 4,768,631 | 9/1988 | Heibel. | |
| 4,787,487 | 11/1988 | Conradi | 188/328 |
| 5,275,260 | 1/1994 | Evans et al. | 188/106 A |
| 5,720,367 | 2/1998 | Evans | 188/325 |

FOREIGN PATENT DOCUMENTS 2697600  5/1994  France.

*Primary Examiner*—Paul N. Dickson
*Assistant Examiner*—Robert A. Siconolfi
*Attorney, Agent, or Firm*—Arent Fox Kintner Plotkin & Kahn PLLC

[57] ABSTRACT

A drum brake device is provided which facilitates the pre-mounting of a long link, without increasing the number of components or the cost of the device. The long link (44) is pivotable on the central segment of one brake shoe (13). An engagement hook (48) protrudes from one or the other of the long link (44) or the one brake shoe (13). A notched groove (25) is formed in the other component thereof. The engagement hook (48) is inserted into the notched groove (25). The rotation of the long link (44) relative to the one brake shoe (13) will cause the long link (44) and one brake shoe (13) to be superimposable and detachable.

7 Claims, 18 Drawing Sheets

DRUM BRAKE DEVICE

BACKGROUND OF THE INVENTION

This invention relates to a drum brake device that functions as a leading-trailing (LT) type when the service brake is applied, and as a duo-servo (DS) type when the parking brake is applied. More specifically, it relates to a drum brake device in which the configuration facilitates the assembly of the device.

This type of drum brake device has been disclosed, for example, in U.S. Pat. No. 5,275,260, and is explained with reference to FIG. 20 and FIG. 21. A hydraulic cylinder b and an anchor block c are provided on the upper and lower segments of the back plate a respectively. The upper and lower ends of a pair of left and right brake shoes, d, e, engage the hydraulic cylinder b and the anchor block c, respectively. A first shoe return spring f and a second shoe return spring g are stretched between the lower and upper ends f the brake shoes d, e respectively. The parking brake lever h is pivoted on the lower segment of the left brake shoe d. A pivot lever i is pivoted such that its central segment can swing on the central segment of the right brake shoe e. A rod j is mounted horizontally between the brake shoes d, e in the vicinity of the anchor block c. The left end of the rod j engages the brake shoe d and the parking brake lever h. The right end of the rod j engages the brake shoe e and the lower segment of the pivot lever i, respectively.

A screw-type shoe clearance adjustment device k is mounted horizontally between the brake shoes d, e in the vicinity of the hydraulic cylinder b. The left end of the shoe clearance adjustment device k engages brake shoe d, and the right end engages brake shoe e and the upper segment of the pivot lever i respectively. An adjustment lever l is pivotable on the web of the right brake shoe e. One arm of the adjustment lever 1 engages the right end of the shoe clearance adjustment device k, and another arm engages the star wheel m of the shoe clearance adjustment device k. The shoe clearance adjustment device k, the adjustment lever l, and a spring n stretched between the adjustment lever l and the pivot lever i make up an automatic shoe clearance adjustment mechanism.

When the service brake is applied, the two brake shoes d, e spread open with the point of abutment with the anchor block c as the fulcrum, and this drum brake device functions as a leading-trailing type brake.

For activating the parking brake, the parking lever h is to be pulled and, the force of that action is transferred in sequence to the rod j, the pivot lever i, and the shoe clearance adjustment device k. The left shoe d spreads open, with its point of abutment with the anchor block c as the fulcrum, and frictionally engages the brake drum o. Then the pivot lever i spreads open, with its point of abutment with the shoe clearance adjustment device k as the fulcrum. The right brake shoe e, on which the pivot lever i is pivoted, spreads open simultaneously to frictionally engage the brake drum o. Moreover, the reaction force of the parking brake lever h is acting on the lower segment of the left brake shoe d. At this point, should the vehicle be stopped on an incline or decline, and torque is applied on the brake drum o in the direction of arrow R, the friction force of the left brake shoe d is transferred via the shoe clearance adjustment device k as a force to spread open the right brake shoe e. Should torque be applied in the opposite direction on the brake drum o, the friction force of the right brake shoe e is transferred via the shoe clearance adjustment device k to the left brake shoe d. As such, when the parking brake is applied, this drum brake device functions as a duo-servo type brake.

The conventional drum brake device uses a pivot sleeve p and an E ring q to pre-mount the pivot lever i onto the one brake shoe e as shown in FIG. 21. Several disadvantages result.

The extra components, namely, the pivot sleeve p and E ring q, required to pre-mount the pivot lever i onto the brake shoe e increase the cost of the device.

The pivot sleeve p is installed by utilizing a shoe hold mechanisms. As shown in FIG. 21, the pivot sleeve p is installed such that its flange r lies between the shoe web u and the bottom face of the plate spring t which forms part of the shoe hold mechanism s. Therefore, a different holding force would be generated on the left and right brake shoes d, e if the left and right shoe hold mechanisms were of the same dimensions, thereby increasing the resistance of the brake shoe e with attached pivot lever i to extend or contract, possibly causing the brake shoe to drag or creating other problems thereof.

To avoid the possible problems of potential dragging of brake shoe e, it is necessary to design the left and right shoe hold mechanisms to different specifications. For example, the length of the pin v comprising part of the right shoe hold mechanism s could be made longer than the pin v of the left shoe hold mechanism, or the plate springs t, t could be designed to different specifications, or the height of the drawn step of the backplate a on which the pin v is mounted could be increased. In any of these cases, a difference by an amount equal to the thickness of the flange r of the pivot sleeve p must be compensated. In other words, in order that the left and right shoe hold mechanisms perform uniformly, at the very least, the components of one mechanism would have to be built to the same shape but of different dimensions. The greater number of components coupled with different specifications for certain similar components would not only make the device more expensive but create chances of misassembling the device.

In handling the brake shoe e on which the pivot lever i is mounted, it can rotate freely until either the upper or lower segments of the pivot lever i abuts against the shoe rim. This is a nuisance when installing the shoe clearance adjustment device k and the rod j onto a drum brake device which is already mounted on the vehicle in the repair shop.

OBJECTS AND SUMMARY OF THE INVENTION

This invention was designed to resolve the above disadvantages. To that end, an object of the invention is to provide a drum brake device which has fewer components and therefore is less expensive, and which decreases chances of misassembling the device.

Another object of this invention is to provide a drum brake device which facilitates the pre-mounting of a long link.

To achieve these objects, the present invention is a drum brake device comprising certain particular structure. A back plate is provided. Two brake shoes are set to face each other on top of the back plate. A service brake actuator activated by a service brake is mounted on the back plate between one pair of adjacent ends of the brake shoes. An anchor is mounted on the back plate between the other pair of the second adjacent ends of the brake shoes. A shoe clearance adjustment device adjacent to the service brake actuator provided between the two brake shoes. A parking brake actuator activated by a parking brake is provided adjacent to the anchor. A long link is provided having a central segment pivotably mounted at a pivot point on a central segment of one brake shoe; and one end of the link and the other end of the link respectively and functionally engaged with the shoe clearance adjustment device and the parking brake actuator. An engagement means is provided between the long link and the one brake shoe such that the long link and the one brake shoe are superimposable and detachable, and such that when the long link and the one brake shoe are rotated relative to each other with their central pivot member as the fulcrum and the long link and the one brake shoe remain superimposed and inseparable.

In order to pivotally connect the long link and the one brake shoe, a protuberance can be integrally formed by a press on one or the other of the central segment of the long link or the central segment of the one brake shoe, and a hole can be bored in the central segment of the other, wherein the protuberance is pivotable inside the hole.

The engagement means can include an engagement hook which protrudes from one or the other of the long link or the one brake shoe and a notched groove is formed in the other; the engagement hook having a front tip, a stem which can rotate within the notched groove, and a overhanged segment of sufficient length to keep the long link and one brake shoe inseparable remain superimposed and inseparable at the pivot front tip.

The engagement means can include a hook Which protrudes from one or the other of the long link or the one brake shoe, and an L-shaped, T-shaped, or mushroom-shaped hole is bored in the other component thereof, wherein a central stem of the engagement hook between a front tip and a base thereof can rotate within the hole when the engagement hook is inserted through the hole and a overhanged segment of sufficient length to keep the long link and the one brake shoe remain superimposed and inseparable at the pivot front tip.

The engagement hook which protrudes from one or the other of the long link or the one brake shoe can be integrally formed with the one or the other.

An automatic shoe clearance adjustment mechanism which senses the amount by which the pair of brake shoes have extended apart and automatically makes an adjustment thereof can be provided. Such a mechanism can include a pivoting adjustment lever and a pin engaging the lever, and the engagement hook protruding from one or the other of the long link or the one brake shoe commonly used as the pin.

The notched groove or hole formed in the other of one or the other of the long link or the one brake shoe can be shaped as an arc to function as the fulcrum for the central pivot member of the long link and the one brake shoe. The engagement hook protruding from one or the other of the long link or the one brake shoe can be positioned at a fixed position on the assembled brake body when it is rotated to the position at which it abuts an inner wall of the notched groove or hole.

In another aspect of the invention, it is a drum brake device comprising certain particular structure. A back plate is provided. Two brake shoes are set to face each other on top of the back plate. A service brake actuator activated by a service brake is mounted on the back plate between one pair of adjacent ends of the brake shoes. An anchor is mounted on the back plate between the other pair of the other adjacent ends of the brake shoes. A shoe clearance adjustment device is provided adjacent to the service brake actuator provided between the two brake shoes. A parking brake actuator activated by a parking brake is provided adjacent to the anchor. A long link is provided having a central segment pivotably mounted at a pivot point on a middle segment of one brake shoe and one end of the link and the other end of the link respectively and functionally engaged with the shoe clearance adjustment device and the parking brake actuator. A center of gravity of the long link is set such that when the back plate is affixed to a non-rotating component of a vehicle body and the long link has been mounted onto the one brake shoe arranged on top of the back plate, a face of the one brake shoe and a face of the long link that abut and engage the shoe clearance adjustment device are aligned to virtually form one face.

A regulating mechanism can be provided that regulates the rotation of the long link arising from its torque such that the face of the one brake shoe and the face of the long link that abut and engage with the shoe clearance adjustment device are aligned to virtually form one face.

The regulating mechanism that regulates the rotation of the long link can comprise an engagement hook protruding from one or the other of the long link or other one brake shoe and a groove or hole formed in the other.

BRIEF DESCRIPTION OF THE DRAWINGS

The above and other objects and the attendant advantages of the present invention will become readily apparent by reference to the following detailed description when considered in conjunction with the accompanying drawings wherein.

PREFERRED EMBODIMENTS OF THE INVENTION

EXAMPLE 1

Figure 1:
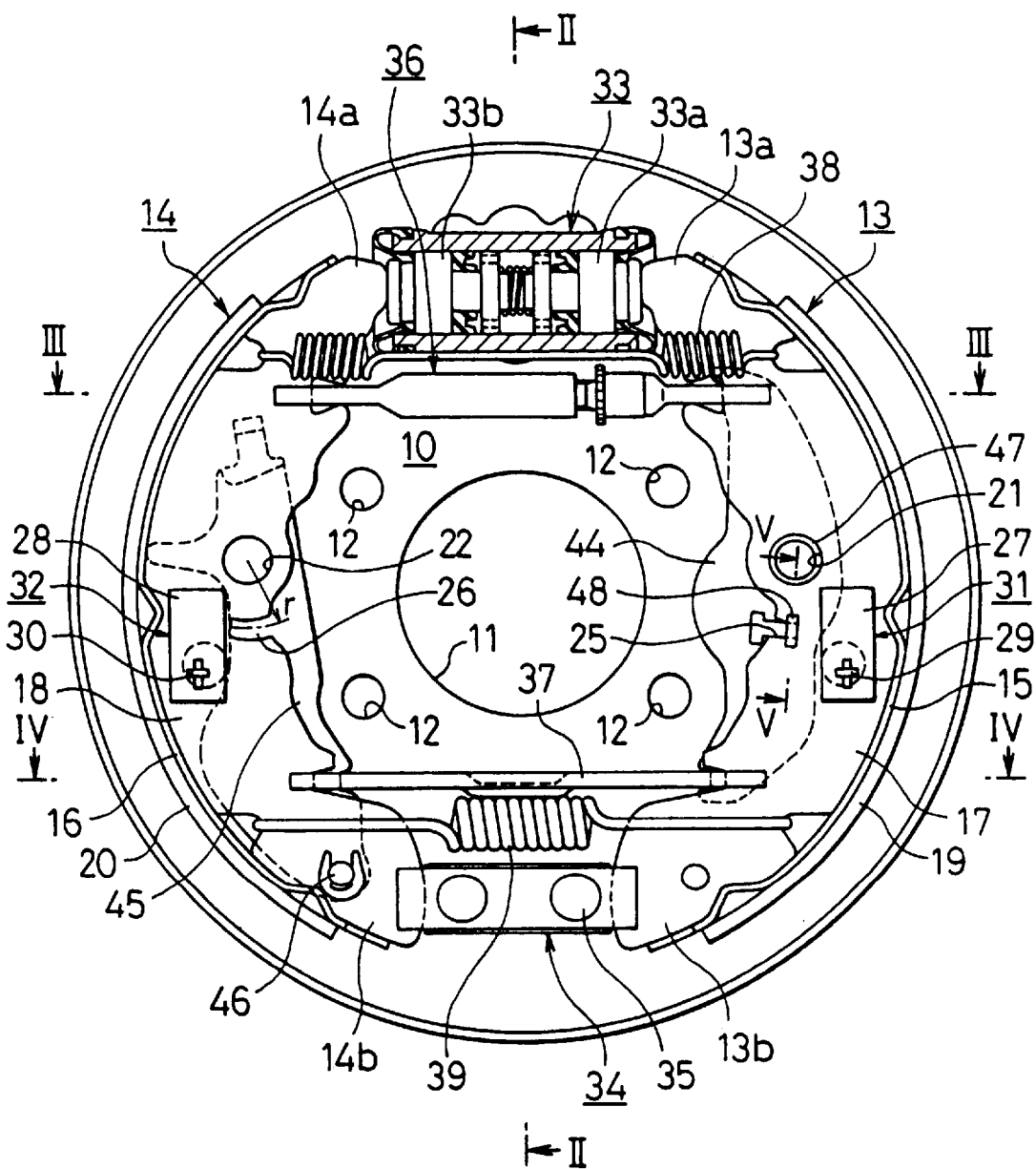
FIG. 1 is a plan view of the drum brake device of this invention as embodied in Example 1 and Example 2.
Figure 2:
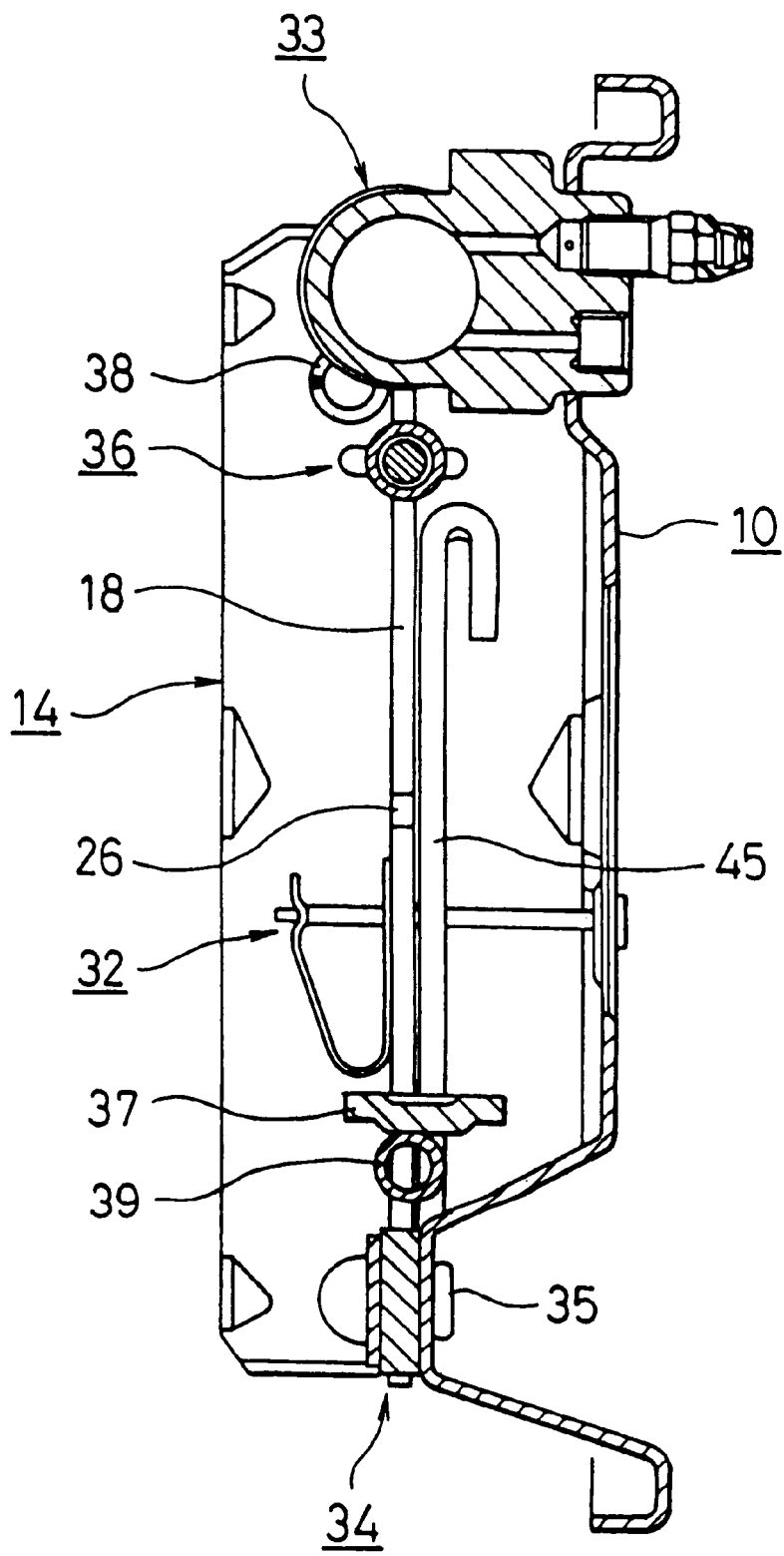
FIG. 2 is a cross section view of FIG. 1 taken along line II—II.
Figure 3:
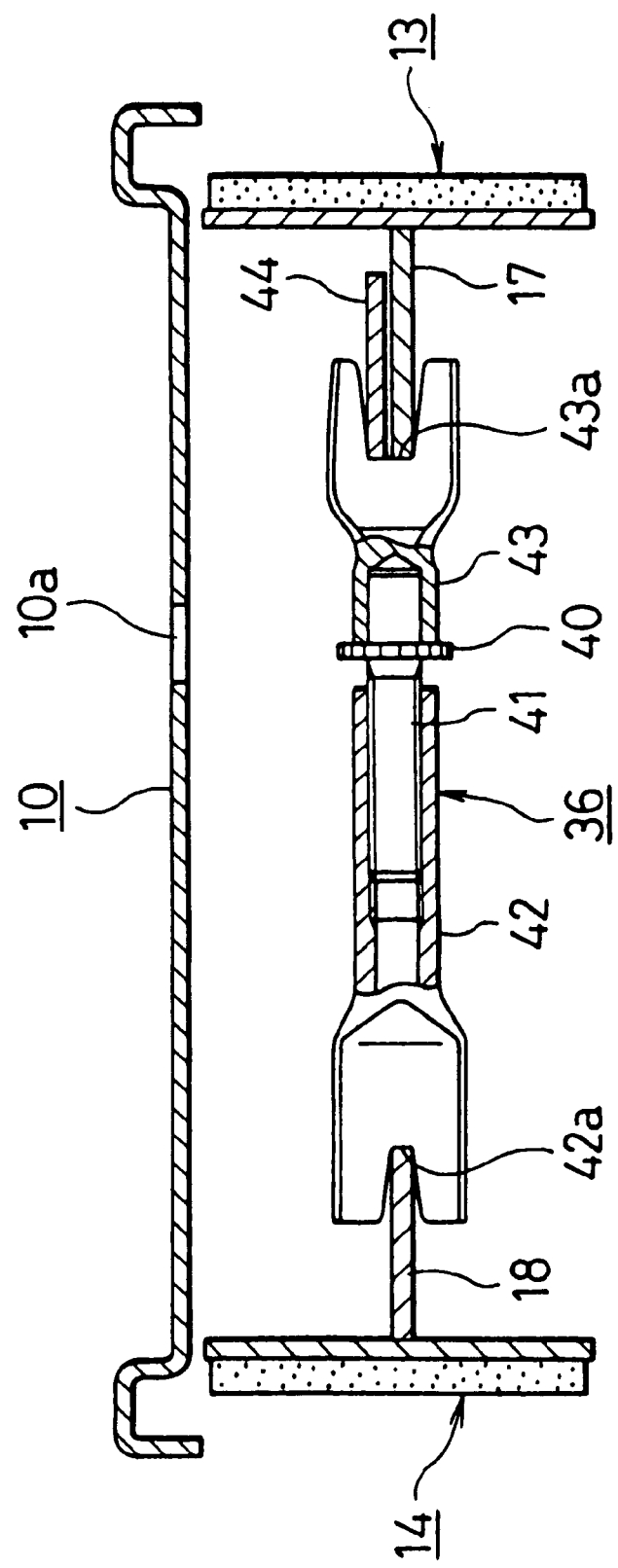
FIG. 3 is a cross section view of FIG. 1 taken along line III—III.
Figure 4:
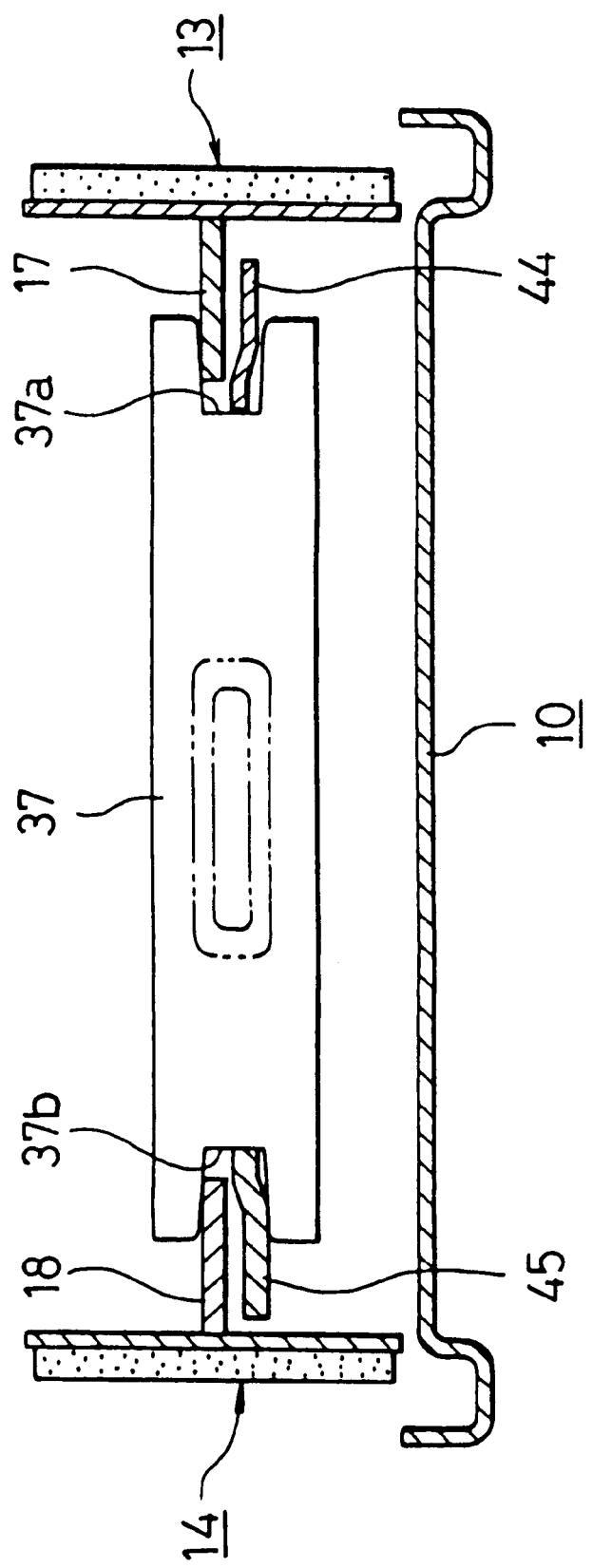
FIG. 4 is a cross section view of FIG. 1 taken along line IV—IV.

A first embodiment of this invention is explained as based on the configurations of FIG. 1 to FIG. 8. The drum brake device includes a backplate 10.

The central hole 11 of the backplate 10 is freely inlaid in the vehicle axle, and the backplate 10 is then affixed to a stationary member of the vehicle by bolts inserted through plural bolt holes 12. A pair of brake shoes 13, 14, are provided each including a shoe web 17, 18 joined to the inner side of a curved shoe rim 15, 16 so as to form a "T" in cross section, and a lining 19, 20 affixed around the perimeter of the shoe rim 15, 16. A pivot hole 21, 22 is bored in the virtual center of each shoe web 17, 18, and a notched groove 25, 26 is formed below each pivot hole 21, 22, respectively. The notched grooves 25, 26 are each formed in the shape of an arc of equal radius r from the center of the pivot hole 21, 22. Each brake shoe 13, 14 is elastically mounted on the backplate 10 by a conventional shoe hold mechanism 31, 32. The shoe hold mechanism each comprises a plate spring 27, 28 and pin 29, 30, at a position distant from the pivot holes 21, 22 and grooves 25, 26.

In this embodiment, a pivot hole 22 and notched groove 26 are formed on the left brake shoe 14 in order to increase its commonality with the right brake shoe 13, but this is not a mandatory specification for this invention.

The actuator 33 is a hydraulic or air cylinder activated by the service brake, and is affixed on top of the back plate 10 by bolts or other hardware. A pair of pistons 33a, 33b inside the actuator 33 is each lightly energized in the direction of the respective upper adjacent ends 13a, 14a (one end) of the facing brake shoes 13, 14. An anchor block 34 is affixed to the backplate 10 by rivets or other hardware, and supports each lower adjacent end 13b, 14b (other end) of the brake shoes 13, 14.

A conventional screw-type shoe clearance adjustment device 36 is mounted horizontally between the upper ends of the brake shoes 13, 14. A plate strut 37 is mounted horizontally between the lower ends of the brake shoes 13, 14. A shoe return spring 38, 39 is stretched between the upper and lower ends of the brake shoes respectively. It is preferable that the spring force of the lower shoe return spring 39 and the upper shoe return spring 38 are set to prevent the brake shoes 13, 14 from separating at the lower end (anchor block) first when the parking brake is applied.

The shoe clearance adjustment device 36 comprises a bolt 41 with an adjustment teeth 40, a tube segment 42 into which one end of the bolt 41 is screwed, and a socket 43 inside which the other end of the bolt 41 is housed such that it can rotate. A regular screwdriver or other hardware can be inserted into a hole 10a bored in the backplate 10, or a hole bored in the brake drum (not shown in the diagram) to turn the adjustment teeth 40 to turn the bolt 41. Screwing the bolt 41 in or out of the tube segment 42 will adjust the entire length of the shoe clearance adjustment device 36. A notched groove 42a, 43a is provided on the compressible end of the tube segment 42 and socket 43 respectively. The shoe web 18 of brake shoe 14 is housed inside and abuts against the bottom of the notched groove 42a. The shoe web 17 of brake shoe 13 and a long link 44, to be described later, are housed inside and abut against the bottom of the notched groove 43a.

The parking brake actuator comprises a forward-pull type brake lever 45 and the plate strut 37 and other components. The brake lever 45 is superimposed under the shoe web 18 of the left brake shoe 14, and is pivotable on the lower end of the shoe web 18 by a pin 46. A U-shaped groove, onto which is latched the remote control cable (not shown in the diagram) is formed on the free end of the brake lever 45. A notched groove 37a, 37b is formed on both ends of the plate strut 37. The shoe web 17 of the brake shoe 13 and the lower segment of the long link 44 are housed in the notched groove 37a on the right end with the long link 44 abutting against the bottom of the groove 37a. The shoe web 18 of the brake shoe 14 and the brake lever 45 are housed in the notched groove 37b on the left end with the brake lever 45 abutting against the bottom of the groove 37a.

The drum brake device is equipped with a long link 44 which mutually transfers the forces acting on each brake shoe 13, 14 when the parking brake is applied. The long link 44 is superimposed under the shoe web 17 of the right brake shoe 13, and is pivoted such that the protuberance 47 formed in the central segment of the long link 44 can slip into and turn inside the pivot hole 21 of the shoe web 17. The protuberance 47 can be formed as a burr by a press as shown in FIG. 5, or can be formed as drawing with a press which has a bottom face as shown in FIG. 6.

Also, although not illustrated, the position of the protuberance 47 and the pivot hole 21 can be reversed, with the protuberance 47 being formed on the shoe web 17 and the pivot hole 21 being bored in the long link 44. As another alternative, a separate pin can be set on either the shoe web 17 or the long link 44 such that the long link 44 is pivotable on the shoe web 17.

The configuration for the provisional assembly of the long link 44 is explained next.

Figure 5:
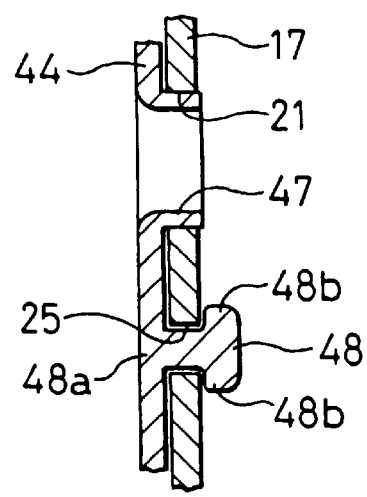
FIG. 5 is a cross section view of FIG. 1 taken along line V—V.
Figure 6:
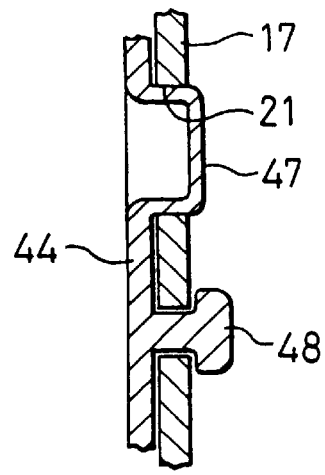
FIG. 6 illustrates a modified example of FIG. 5.

As shown in FIG. 1 and FIG. 5, an engagement hook 48 in the shape of a short-stemmed "T" is formed on the long link 44 in order to pre-mount it onto the one brake shoe 13. It is preferable that the engagement hook 48 be integrally formed on the long link 44 by, for example, bending the hook from the base material to be at right angles to the long link 44; but alternatively, a separate T-shaped piece can be formed and affixed onto one side of the long link 44.

Figure 7:
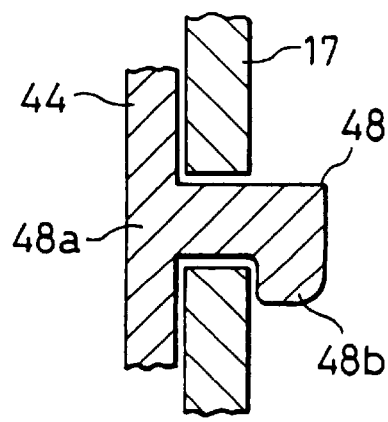
FIG. 7 illustrates a modified example of FIG. 5.

The engagement hook 48 includes a stem segment 48a which is slidable inside the notched groove 25, and an overhanged segment 48b formed at the tip of the stem segment 48a. The overhanged segment 48b prevents the shoe web 17 and the superimposed long link 44 from separating, and can be formed at both sides of the tip of the stem segment 48a to form a T-shaped hook as shown in FIG. 5, or can be formed at one side only of the tip of the stem segment 48a as shown in FIG. 7.

If as shown in FIG. 1, the backplate 10 is affixed to the vehicle with the actuator 33 activated by the service brake set virtually at the top thereof, then the long link 44 constantly rotates, by its own weight, in the counter clockwise direction with its pivot point with the shoe web 17 as the fulcrum. In other words, it is preferable to design the center of gravity of the long link 44 such that a torque will be applied on the link 44 to rotate the link in the direction to abut the hook 48 onto the bottom of the notched groove 25 of shoe web 17.

Moreover, it is preferable to include a regulating mechanism that will regulate the rotation of the long link 44 to a fixed degree such that the face of the upper end of the long link 44 and the face of the shoe web 17 that abuts and engages with the bottom of the notched groove 43a of the socket 43 of the shoe clearance adjustment device are aligned to virtually form one face. The rotation can be fixed by having the engagement hook 48 abut the bottom of the notched groove 25 of the shoe web 17 when those two faces are aligned to virtually form one face.

Thus, this configuration to have the center of gravity of the long link 44 designed so as to apply a torque to rotate the long link 44, and the inclusion of a mechanism to regulate that rotation of the long link 44 facilitates the mounting of the shoe clearance adjustment device 36 and the strut 37 in too cases. First, in assembling each component onto a horizontally-laid backplate 10 on an assembly line, a visual glance can confirm whether or not the face of the upper segment of the long link 44 and the face of the shoe web 17 are aligned to form one face. Second, in replacing or otherwise manipulating components in a maintenance or repair operation when the back plate 10 is affixed to the vehicle, the long link 44 can be securely held in place in the required position on the brake shoe 13 which is being elastically supported on the back plate 10 by the shoe hold mechanism 31.

Next, the operation of the drum brake device is explained.

In operation of the service brake, when the actuator 33 is pressurized, the upper adjacent ends 13a, 14a of the two brake shoes 13, 14 spread open with the anchor block 34 as the fulcrum, the two brake shoes 13, 14 brake the rotating brake drum (not shown in the diagram). One or the other of brake shoe 13 has a self-servo braking action, while the opposite brake shoe 14 or 13 does not have a self-servo braking action, whereby the device acts as a leading-trailing type brake. In operation of the parking brake, when the control cable, (not shown in the diagram), is pulled, causing the brake lever 45 in FIG. 1 to turn clockwise with the pin 45 as the fulcrum, the strut 37 is pushed to the right. The force pushing on the strut 37 is transferred to the lower segment of the long link 44, whereby the link 44 turns counterclockwise with its protuberance 47 as the fulcrum. With the rotation of the long link 44, the shoe clearance adjustment device 36 is pushed to the left, wherein the upper adjacent end 14a of the left brake shoe 14 spreads open, with the anchor block 34 as the fulcrum, and presses against the brake drum. As the brake lever 45 is pulled further, the long link 44 rotates counterclockwise with the shoe clearance adjustment device 36 as the fulcrum.

At this point, the mounted load of the lower return spring 39 generates a large moment, whereby with the anchor block 34 as the fulcrum, the upper adjacent end 13a of the right brake shoe 13 spreads open to press against the brake drum. If, at this time, a clockwise torque is acting on the brake drum (not shown in the diagram), then the friction force of the left brake shoe 14 is transferred via the shoe clearance adjustment device 36 to the right brake shoe 13, wherein the lower adjacent end 13b of the brake shoe 13 is supported by the anchor block 34 to generate a braking force. Thus both brake shoes 13, 14 have a self-servo action, and the device acts as a duo-servo type brake.

If instead, a counterclockwise torque is acting on the brake drum, the friction force of the right brake shoe 13 is transferred via the shoe clearance adjustment device 35 to the left brake shoe 14, whereby its lower adjacent end 14b of the brake shoe 14 is supported by the anchor block 34, and as in the case where the brake drum is rotating clockwise, the device acts as a duo-servo type brake.

Thus when either the service brake or the parking brake is applied, the brake shoes 13, 14 do not separate from the anchor block 34 until the brake drum rotates. Accordingly, the same action occurs even if the service brake and the parking brake are applied simultaneously, and no impact load is applied to the anchor block 34.

Also, as the braking force as described above is generated, one or the other of brake shoe 13 or brake shoe 14 rotates in tandem with the brake drum, by an amount equivalent to the thrust of the upper segment of the long link 44 to abut the shoe clearance adjustment device 36 to cause the piston 33a or 33b to be repelled. However, the piston is repelled only to an amount equivalent to the gap between the brake drum and the respective lining 19, 20, and the driver does not feel any loss on the next braking action.

Figure 8:
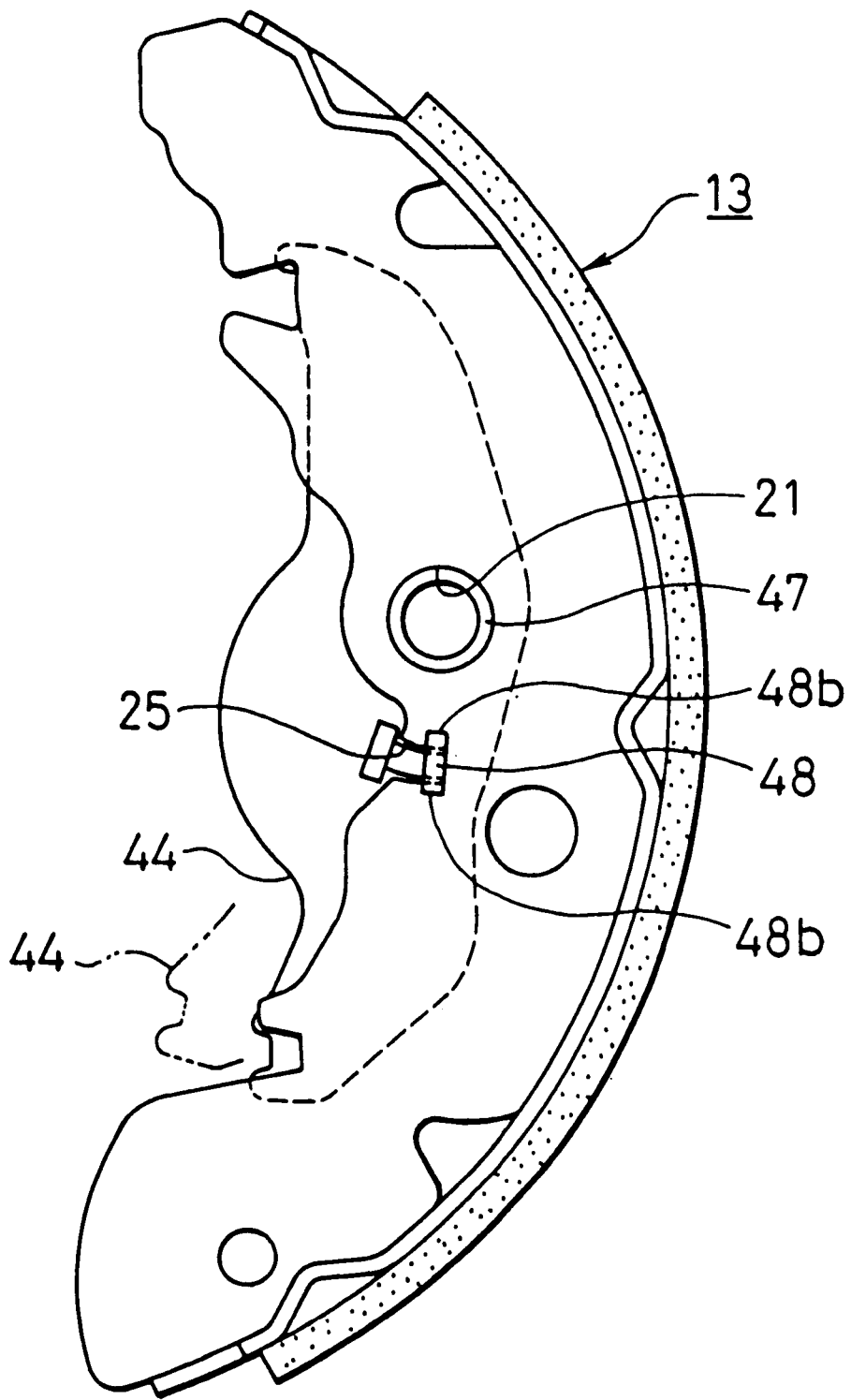
FIG. 8 illustrates and explains the operations to pre-mount the long link onto one brake shoe.

Next, the operations to mount the long link 44 on a brake assembly line are explained based on the pre-mounting diagram of FIG. 8. With the engagement hook 48 of the long link 44 positioned on the inner side of the shoe web 17, the protuberance 47 is inlaid in the pivot hole 21 Then the long link 44 and the brake shoe 13 are rotated relative to each other with the central pivot member formed by the protuberance 47 in the pivot hole 21 as the fulcrum. This will cause the engagement hook 48 to be rotated with the pivot member as the fulcrum and to be inserted into the notched groove 25. As it does so, the two overhanded segments 48b, 48b of the engagement hook 48 engage the plate face of the shoe web 17, whereby the brake shoe 13 and the long link 44 remain superimposed and inseparable.

Once the long link 44 is provisionally attached to the brake shoe 13, the brake shoe 13 and the other brake shoe 14 with brake lever 45 are elastically supported on the backplate 10 by the shoe hold mechanisms 31, 32. Next the right end of the shoe clearance adjustment device 36 and the right end of the strut 37 engage the brake shoe 13 and the long link 44, and the left ends engage the brake shoe 14 and the brake lever 45. Finally, the shoe return springs are stretched between the two brake shoes 13, 14.

With these operations, the long link 44 is preassembled and mounted onto the brake shoe 13, and is maintained in a fixed position, hence the long link 44 requires no separate support.

There are two separate occasions for the assembly of a drum brake device. One is the brake assembly line operation just described, in which the backplate 10 is laid on a conveyor belt or other horizontal surface and the components are assembled onto it. The other assembly is in a repair or maintenance operation in which the back plate 10 is already affixed onto the vehicle with the service brake actuator 33 installed virtually at the top of the backplate 10, and certain components are replaced or otherwise manipulated.

For the brake assembly line operation, a visual observation can determine whether the face of the upper segment of the long link 44 and the face of the shoe web 17 which abut and engage the bottom of the notched groove 43a of the socket 43 are aligned to form one face. Thereafter, the other components can be easily assembled as described above.

For the repair operation, this prior assembly of the members makes it easy to confirm whether the face of the long link 44 and the face of the shoe web 17 which abut and engage with the bottom of the notched groove 43a of the socket 43 are aligned to form one face. In addition, with the brake shoe 13 elastically supported on the back plate 10 by the shoe hold mechanism 31, the long link is maintained in the required position on the brake shoe 13 by its own weight. This facilitates the subsequent mounting of the shoe clearance adjustment device 36 and the strut 37 without any further support of the long link 44.

To separate the long link 44 from the brake shoe 13, the long link 44 and the brake shoe 13 are rotated in the reverse direction with the pivot member formed by the protuberance 47 and the pivot hole 21 as the fulcrum. This will release the engagement hook 48 from the notched groove 25, wherein the long link 44 can be separated from the brake shoe 13.

EXAMPLE 2

Figure 9:
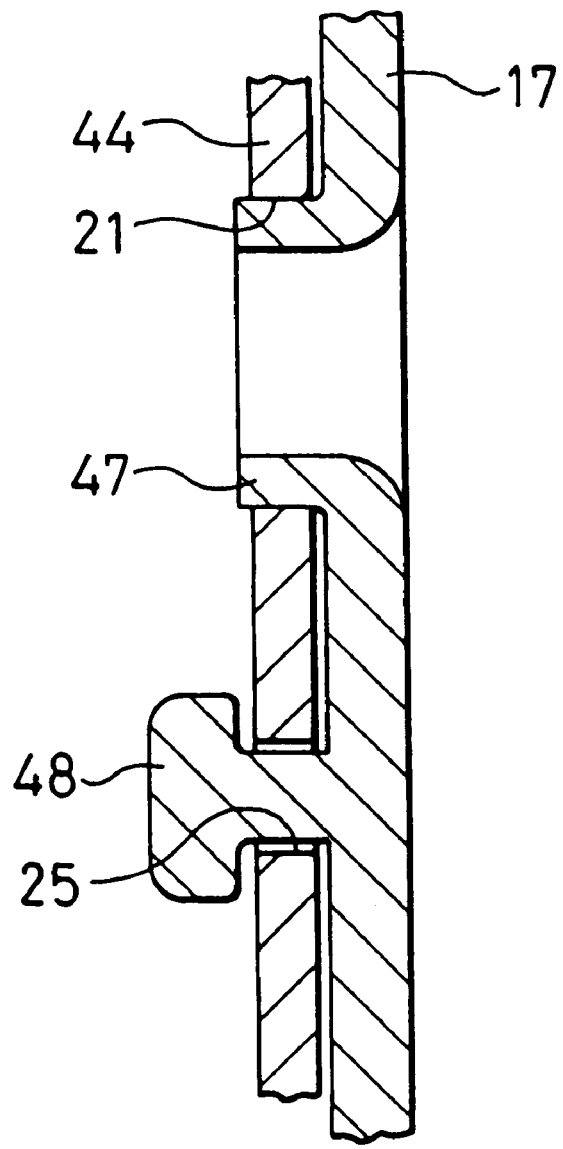
FIG. 9 illustrates a configuration of this invention as embodied in Example 2 in which the engagement means to pre-mount the long link onto the brake shoe is the reverse of the configuration as embodied in Example 1.

FIG. 9 illustrates the pivot member of the long link 44 and the shoe web 17, and the engagement thereof in cross section. In this configuration, the engagement hook 48 is formed on the shoe web 17 of the brake shoe 13, and the notched groove 25 is formed in the long link 44. Moreover, the protuberance 47 can be formed on the shoe web 17, and the pivot hole 21 can be bored in the long link 44.

EXAMPLE 3

Figure 10:
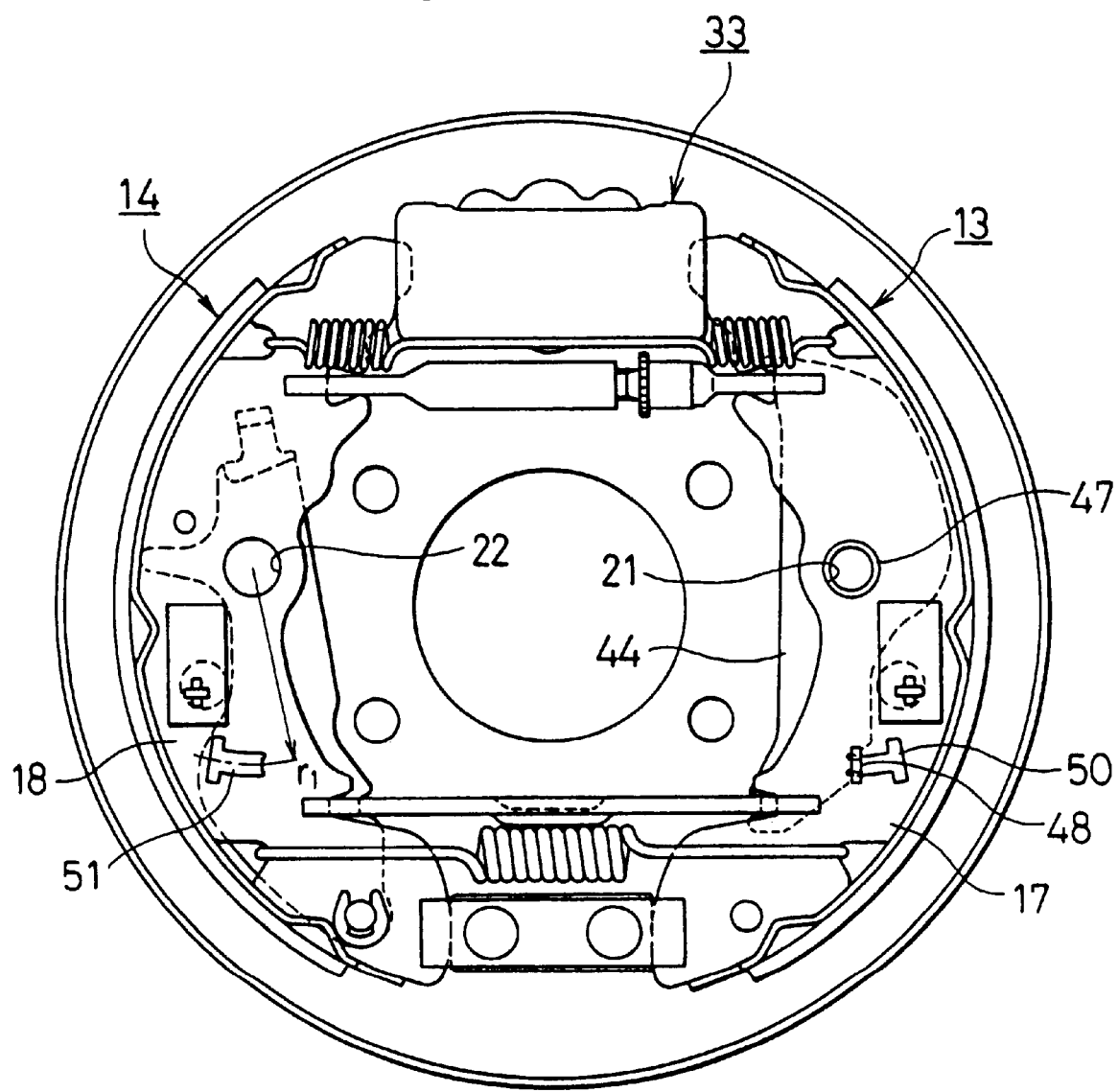
FIG. 10 is a plan view of the drum brake device of this invention as embodied in Example 3 in which a T-shaped engagement hole is bored in the shoe web.
Figure 11:
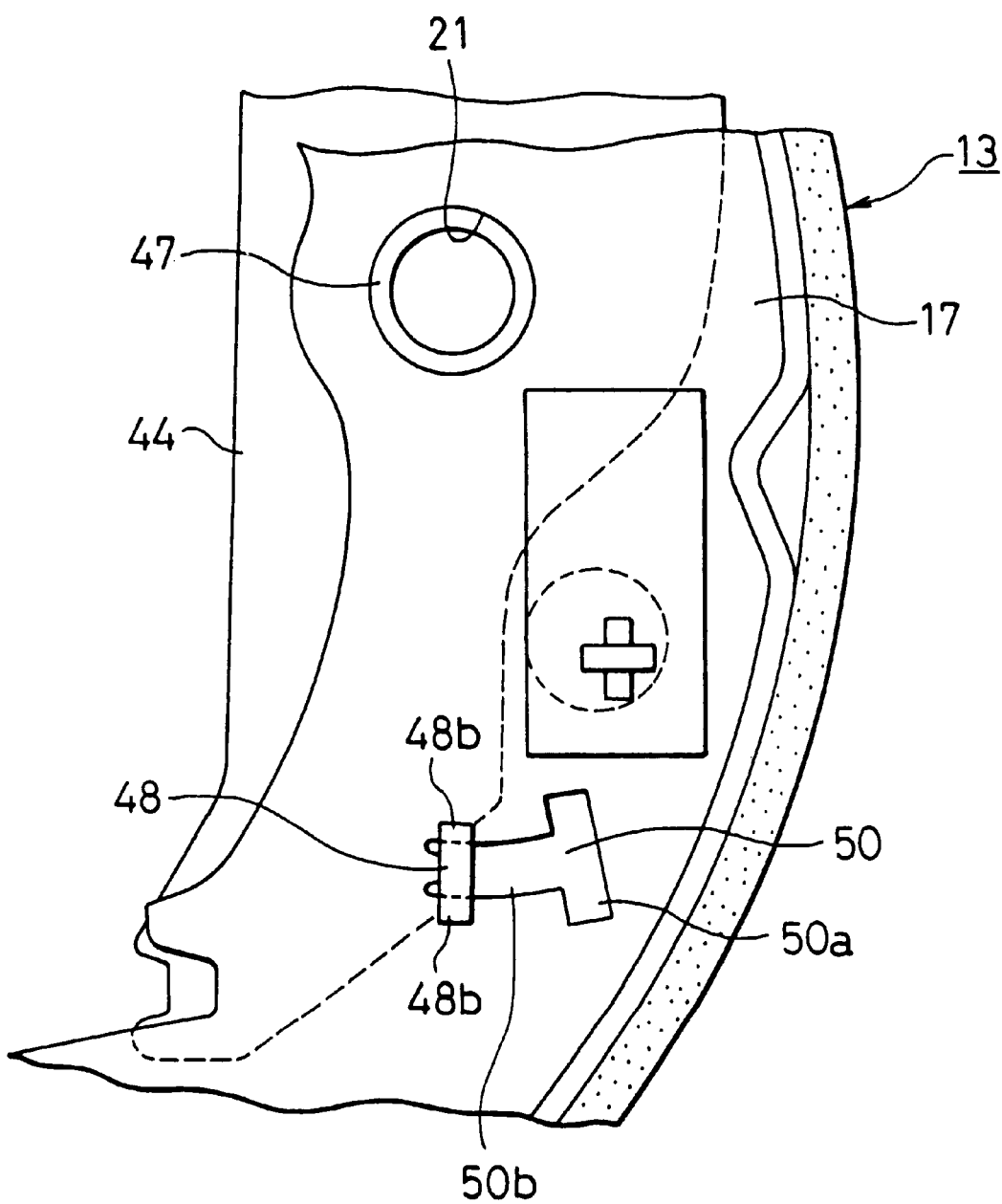
FIG. 11 is an enlarged view of the essential components of FIG. 10.

FIG. 10 and FIG. 11 illustrate another embodiment of this invention in which T-shaped engagement holes 50, 51 are bored in each shoe web 17, 18 respectively in place of the notched grooves. The stem segments of the T-shaped engagement holes 50, 51 are curved and formed at a radius r1 from the center of the central pivot holes 21, 22. In addition, a short-stemmed T-shaped engagement hook 48 is provided vertically on the back edge of the long link 44. Aside from this configuration, a single T-shaped engagement hole 50 can be bored in the one brake shoe 13 on which the long link 44 is to be attached.

To pre-mounted the long link 44 onto the brake shoe 13, the front tip of the engagement hook 48 of the long link 44 is inserted into the wide part of the T-shaped engagement hole 50, then rotated clockwise with the pivot member formed by the protuberance 47 and the pivot hole 21 as the fulcrum, until it abuts the bottom of the curved stem 50b of the engagement hole 50.

This configuration facilitates the manipulation of a drum brake device which has been mounted onto the vehicle, with the service brake actuator positioned at the top as shown in FIG. 10. The center of gravity of the long link 44 has been designed such that the weight of the link 44 will apply a torque to rotate it clockwise with its pivot member with the shoe web 17 as the fulcrum.

As shown in the example of FIG. 7, the overhanged segment 48b at the head of the engagement hook 48 can be extended to one side only of the stem segment and the corresponding engagement hole 50 can in essence be L-shaped. Alternatively, as discussed in the previous embodiment, the position of the engagement hook 48 and engagement hole 50 can be reversed and formed on the brake shoe 13 and long link 44, respectively.

It is a benefit of this configuration that the notched grooves 25, 26 in the configuration of Example 1 reduce the rigidity of the brake shoes 13, 14 to a greater extent than do the T-shaped components of this configuration.

EXAMPLE 4

Figure 12:
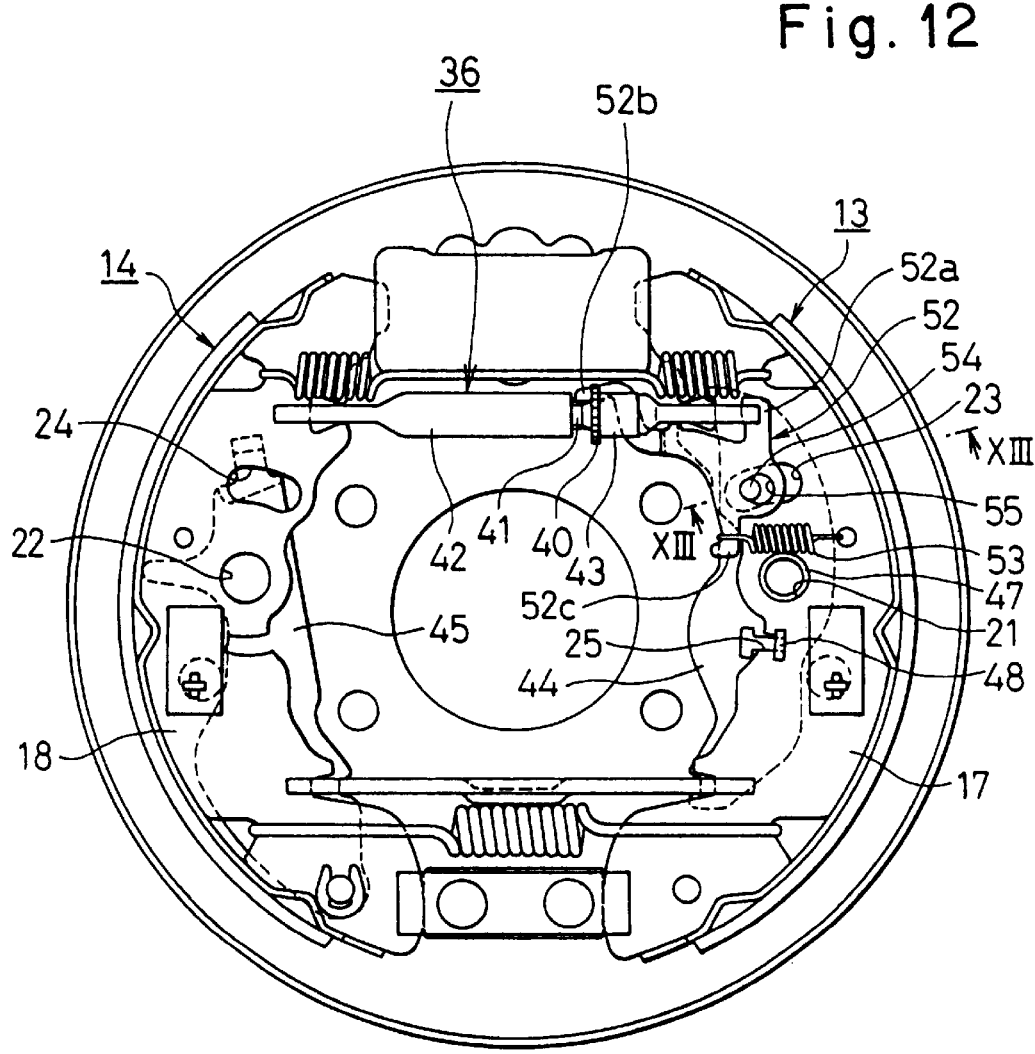
FIG. 12 is a plan view of the drum brake device of this invention as embodied in Example 4 which is equipped with an automatic shoe clearance adjustment device.
Figure 13:
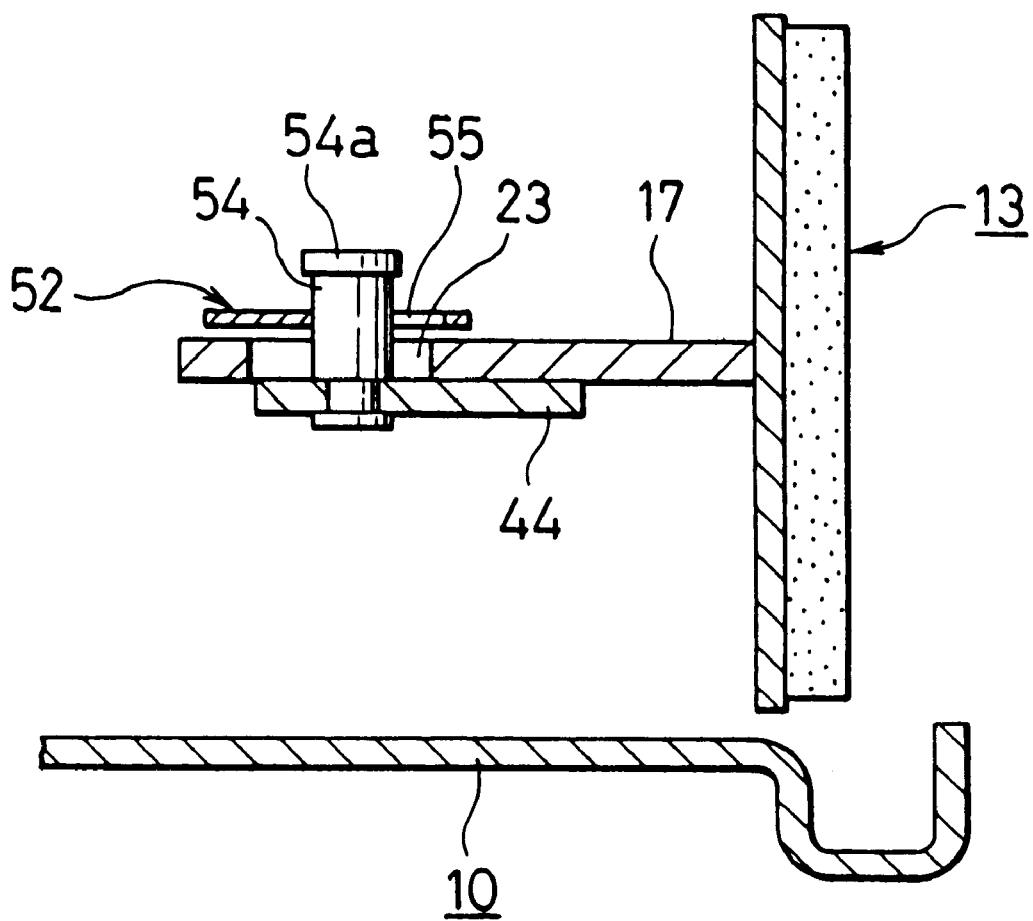
FIG. 13 is a cross section view of FIG. 12 taken along line XIII—XIII.
Figure 14:
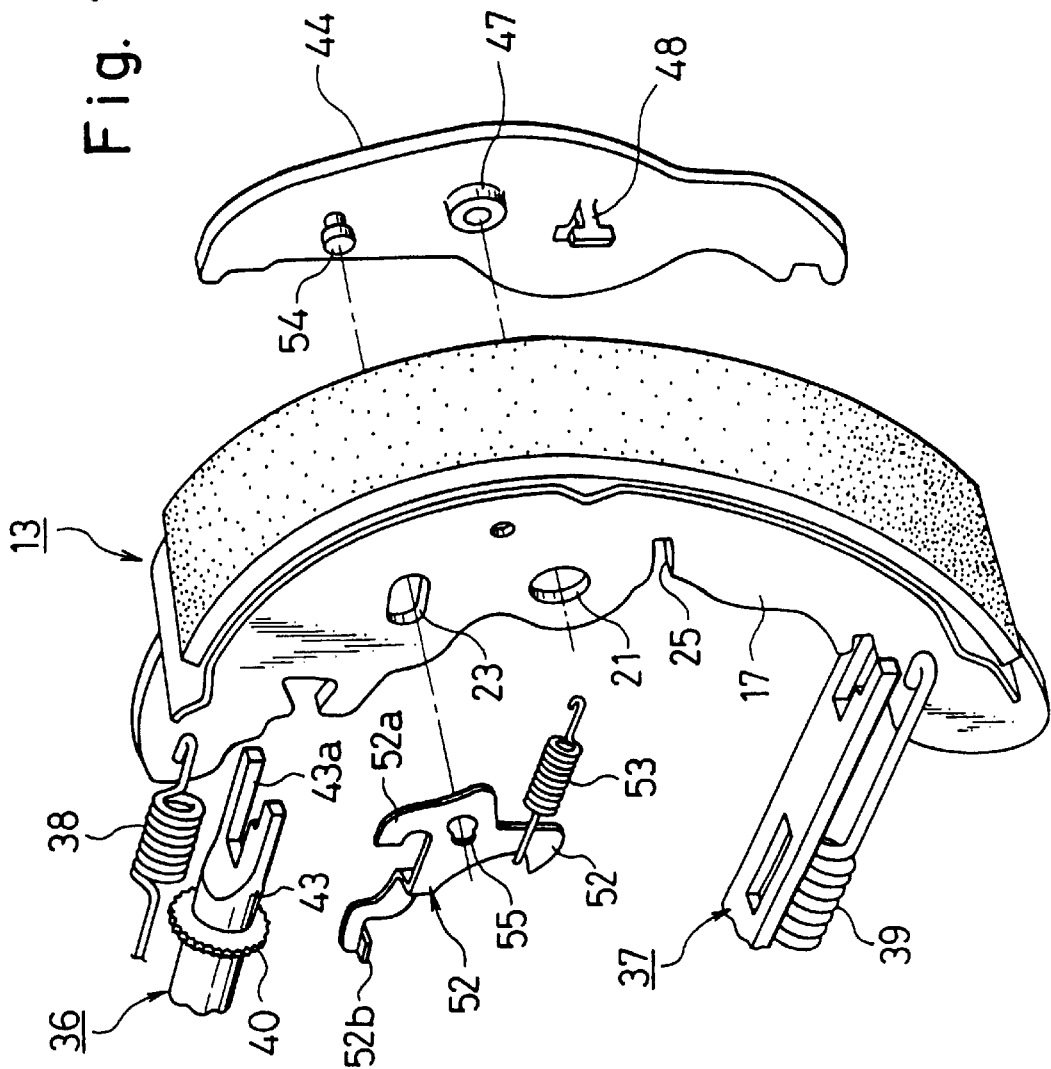
FIG. 14 illustrates some components of the drum brake device in the disassembled state.

FIGS. 12–14 illustrate another embodiment of the drum brake device which is equipped with an incremental type of automatic shoe clearance adjustment device which functions with application of the service brake. The configuration shown here is applicable for the drum brake device of Example 1. Its applicability is the same for Example 2 and Example 3, and an explanation is omitted here.

The automatic shoe clearance adjustment device comprises the shoe clearance adjustment device 36, an adjustment lever 52 pivoted on the long link 44, and an adjustment spring 53 extended between one portion of the adjustment lever 52 and the brake shoe 13. A pin 54 on which the adjustment lever pivots is affixed near the upper end of the long link 44.

Long holes 23, 24 are bored above the pivot holes 21, 22. on the shoewebs 17, 18 of the two brake shoes 13, 14, respectively. The pin 54 is inserted through these long holes 2 3, 24 which should be just long enough to enable the long link 44 to rotate during braking and to secure the required rotation for the pre-mounting of the brake shoes 13, 14 and the long link 44. The long hole 24 on the other brake shoe 14 is bored solely to maintain the commonality of the brake shoes, and as such is not a mandatory specification of this example.

FIG. 13 is a cross section diagram of a portion of an assembled automatic shoe clearance adjustment device. The pin 54 is inserted through the long hole 23 of the shoe web 17. The adjustment lever 52 is pivotable about the stem of the pin 54 by means of a hole 55 bored in its center, and is secured in position by the large-diameter head 54a of the pin 54. One arm 52a of the adjustment lever 52 abuts the stepped face of the notched groove 43a of the socket 43, while another arm 52b engages the adjustment teeth 40 of the bolt 41. The adjustment spring 53 is stretched between a third arm 52c and the shoe web 17, and in the configuration of FIG. 12, the adjustment lever 52 receives the energizing force of the adjustment spring 53 to rotate counterclockwise with the pin 54 as the fulcrum.

The same adjustment function can be obtained by affixing the pin 54 on the shoe web 17 and pivoting the adjustment lever 52 on the brake shoe 13. In this case, the long holes 23, 24 on the shoe webs 17, 18 respectively can be omitted.

Other components of the drum brake device as shown in FIG. 12 and FIG. 14 include the pivot hole 21, notched groove 25, strut 37, shoe return springs 38, 39, protuberance 47, and engagement hook 48.

The automatic shoe clearance adjustment operation can be described briefly as follows. If the service brake is applied and the two brake shoes 13, 14 spread open, the shoe clearance adjustment device 36 trails the left brake shoe 14, and the long link 44 is virtually in tandem with and trails the right shoe 13. At this point, the other arm 52b of the adjustment lever 52 is rotated counterclockwise, as shown in FIG. 12, with the pin 54 as the fulcrum by an amount just equal to the movement of the pin 54 plus the movement of the shoe clearance adjustment device 36. If, at this time, the lining is worn, and the rotation of the other arm 52b exceeds the pitch of the adjustment teeth 40, the bolt 41 is rotated and screwed out of the tube 42 to automatically maintain the clearance between the brake drum and the lining at a constant value.

When the parking brake is applied, the shoe clearance adjustment device 36, the upper portion of the long link 44, and the adjustment lever 52 trail in tandem the left brake shoe 14 only by the amount it extends. However, since the pin 54 is freely inlaid within the long hole 23 of the right brake shoe 13, it has no effect whatsoever on the adjustment lever 52. Accordingly, the automatic adjustment does not occur since the rotation of the adjustment lever 52 is smaller when the parking brake is applied than when the service brake is applied.

EXAMPLE 5

Figure 15:
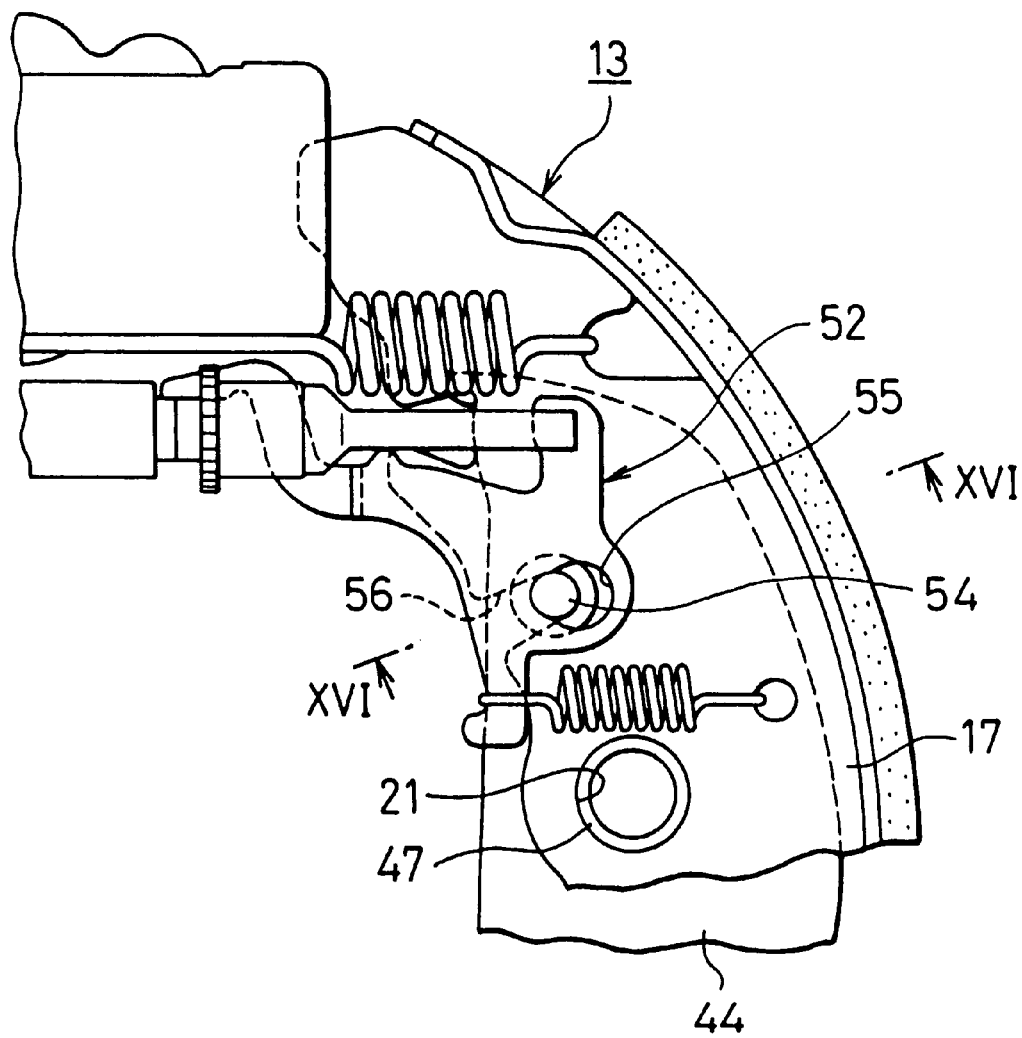
FIG. 15 is a plan view of the essential segment of the drum brake device of this invention as embodied in Example 5 in which a portion of the automatic shoe clearance adjustment device is utilized as an engagement means.
Figure 16:
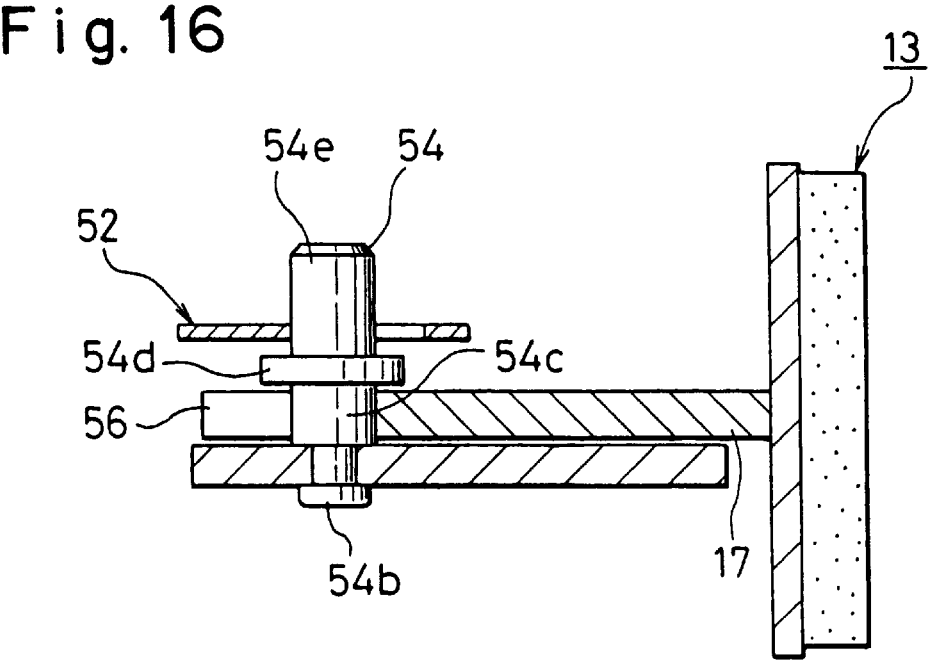
FIG. 16 is a cross section view of FIG. 15 taken along line XVI—XVI.
Figure 17:
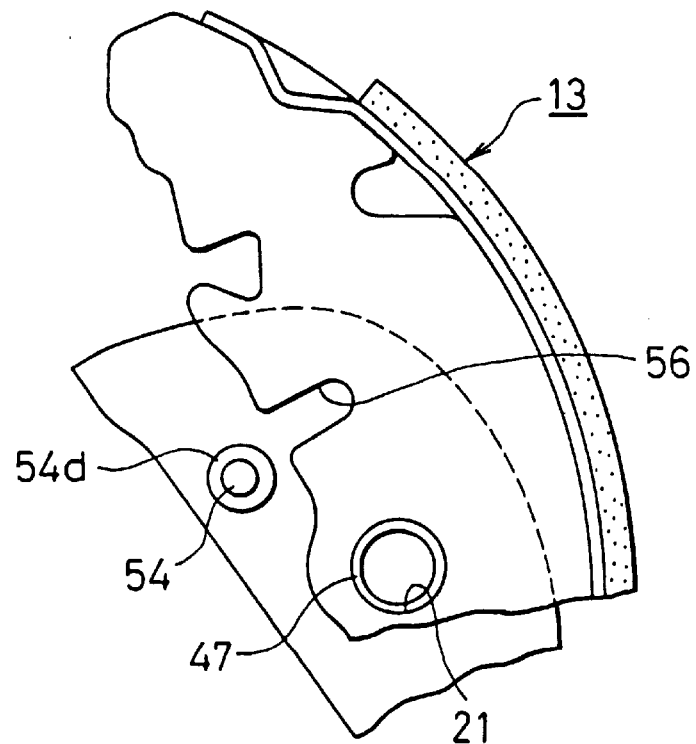
FIG. 17 explains the operations for the provisional assembly of the long link onto the one brake shoe.

FIGS. 15–17 illustrate another means of engaging the long link 44 with the brake shoe 13 by using one portion of the automatic shoe clearance adjustment device, namely the pin 54 on which the adjustment lever is pivoted.

This configuration utilizes the pin 54 which is provided on the long link 44, for which a corresponding arc-shaped notched groove 56 is formed on the shoe web 17 of the brake shoe 13. The pin 54 comprises a fixed segment 54b by which it is affixed it to the long link 44 as shown for example in FIG. 16, a stem segment 54c which is movable within said notched groove 56, a protuberance 54d of larger diameter than and formed on top of the stem 54c to sandwich the shoe web 17 between it and the long link 44 such that the shoe web and long link can rotate relative to each other, and a pivot segment 54e which penetrates through the hole 55 in the adjustment lever 52 such that the latter can pivot on it.

To pre-mount the long link 44 on the brake shoe 13, the only operations required are to first inlay the protuberance 47 of the long link 44 into the pivot hole 21 of the shoe web 17 as shown in FIG. 17 to form a pivot member, then to rotate the long link 44 and the brake shoe 13 relative to each other with the pivot member as the fulcrum such that the pin 54 inserted into the notched groove 56. In doing so, the protuberance 54d of the pin 54 is positioned on the top face of the shoe web 17, thus keeping the long link 44 superimposed under and inseparable from the brake shoe 13.

EXAMPLE 6

Figure 18:
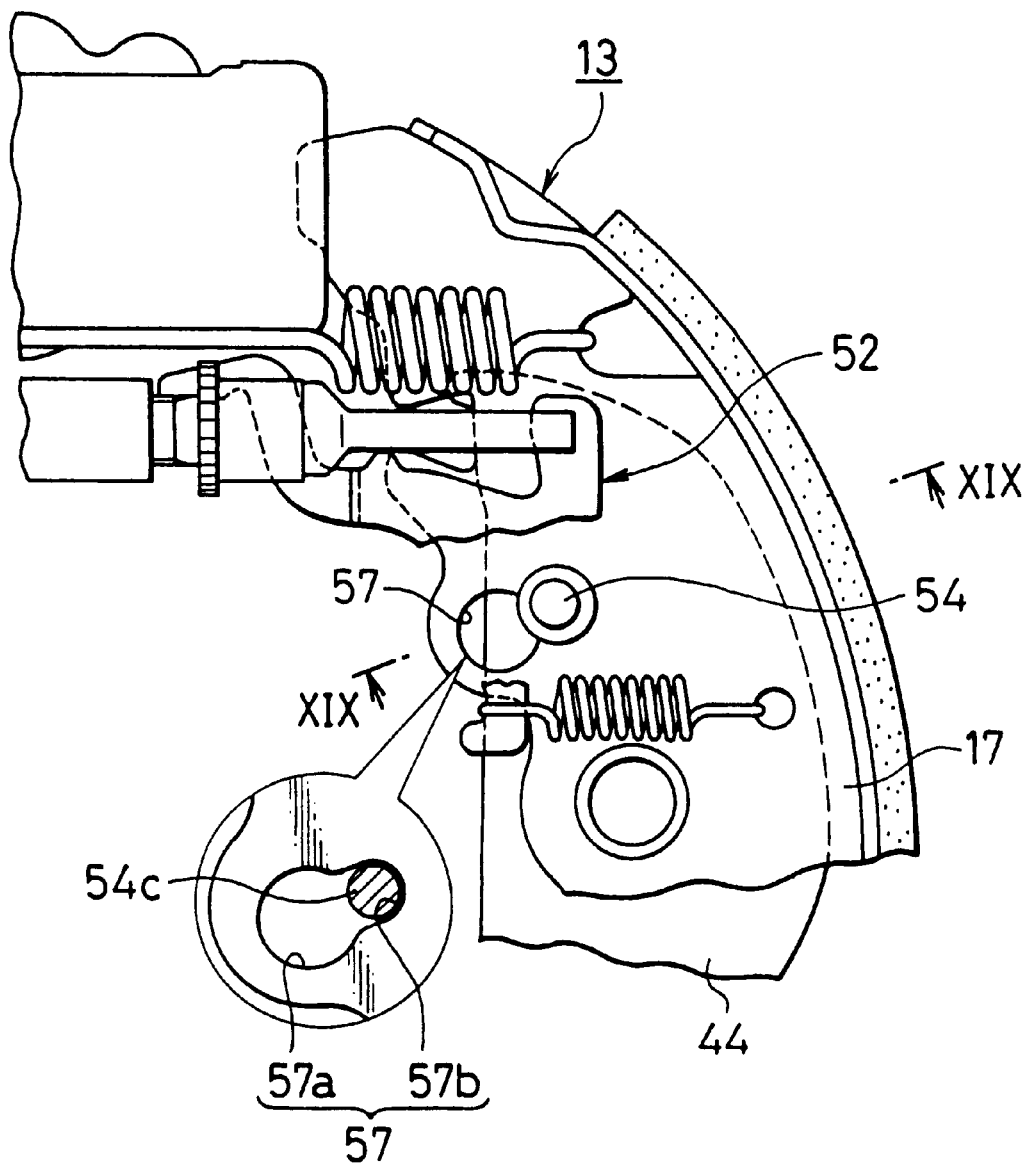
FIG. 18 is a plan view of the drum brake device embodied in Example 6 in which the long hole is molded be mushroom-shaped.
Figure 19:
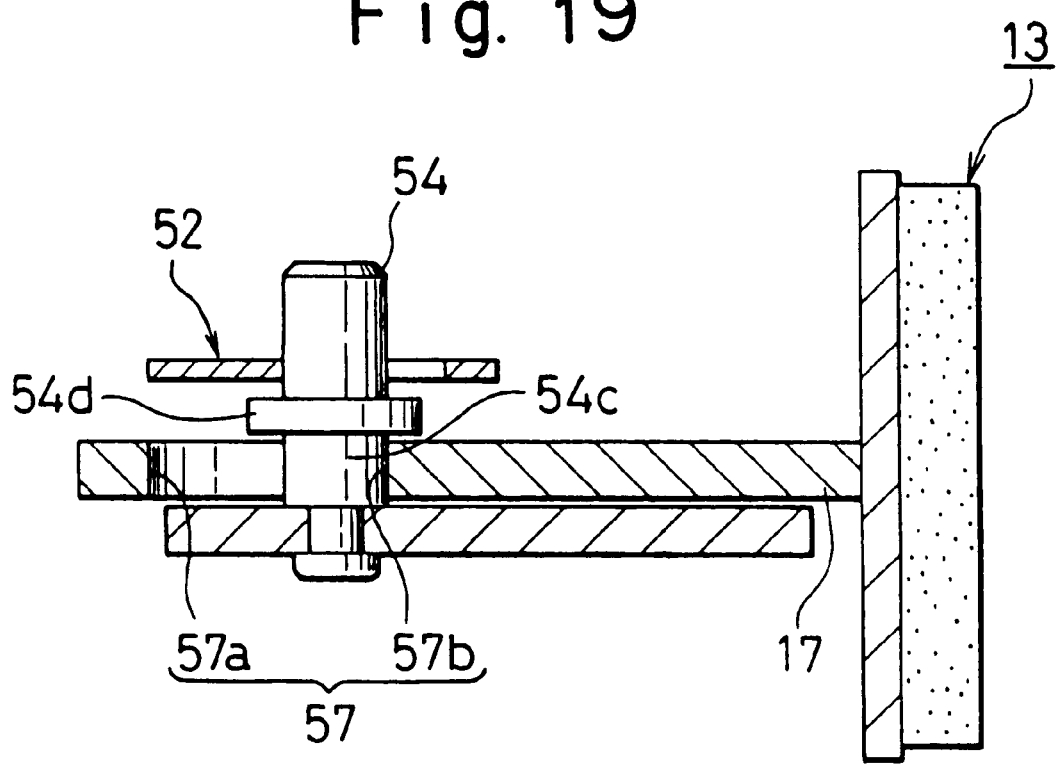
FIG. 19 is a cross section view of FIG. 18 taken along line XIX—XIX.
Figure 20:
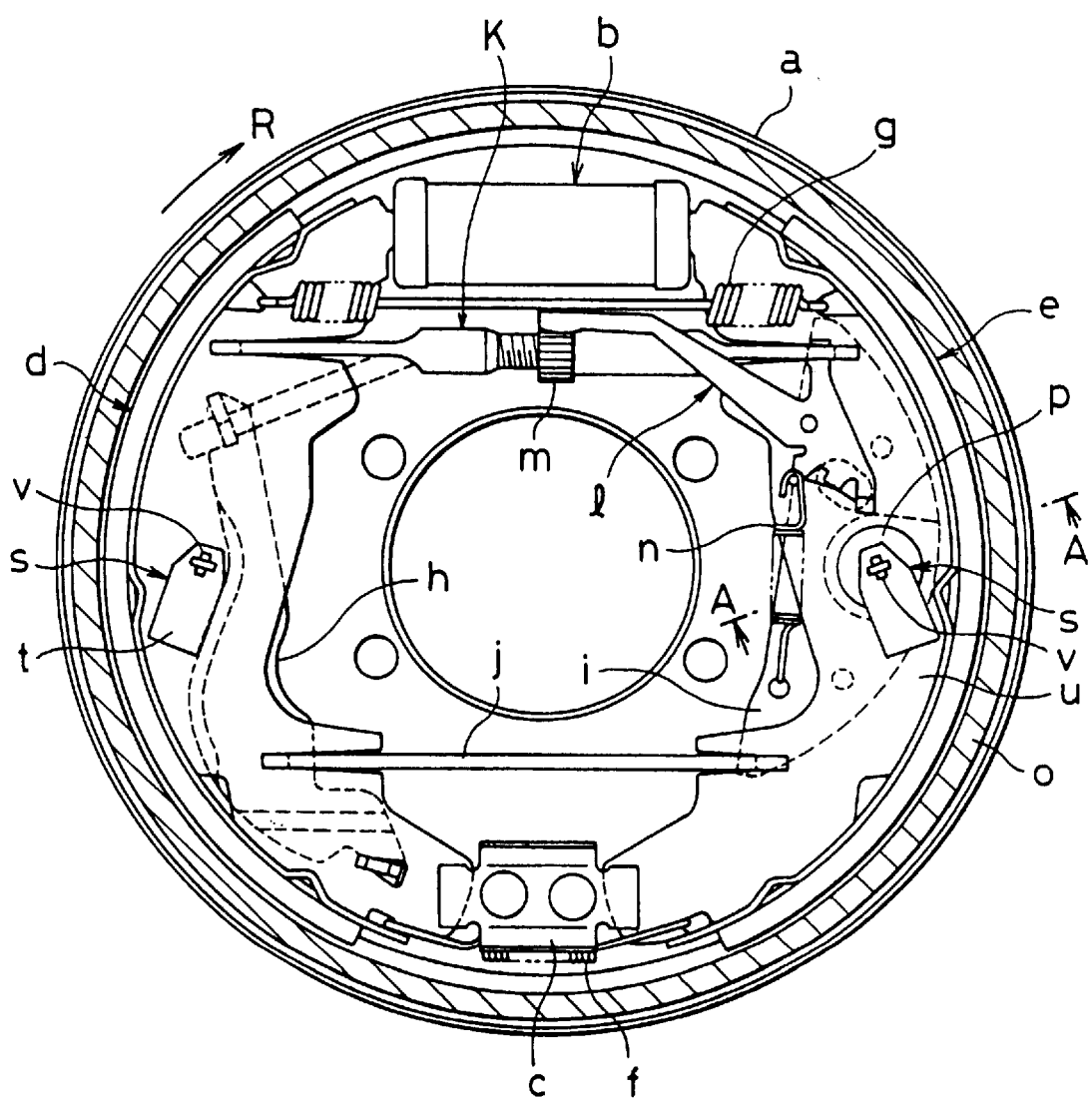
FIG. 20 is a plan view of the conventional drum brake device on which this invention was based.
Figure 21:
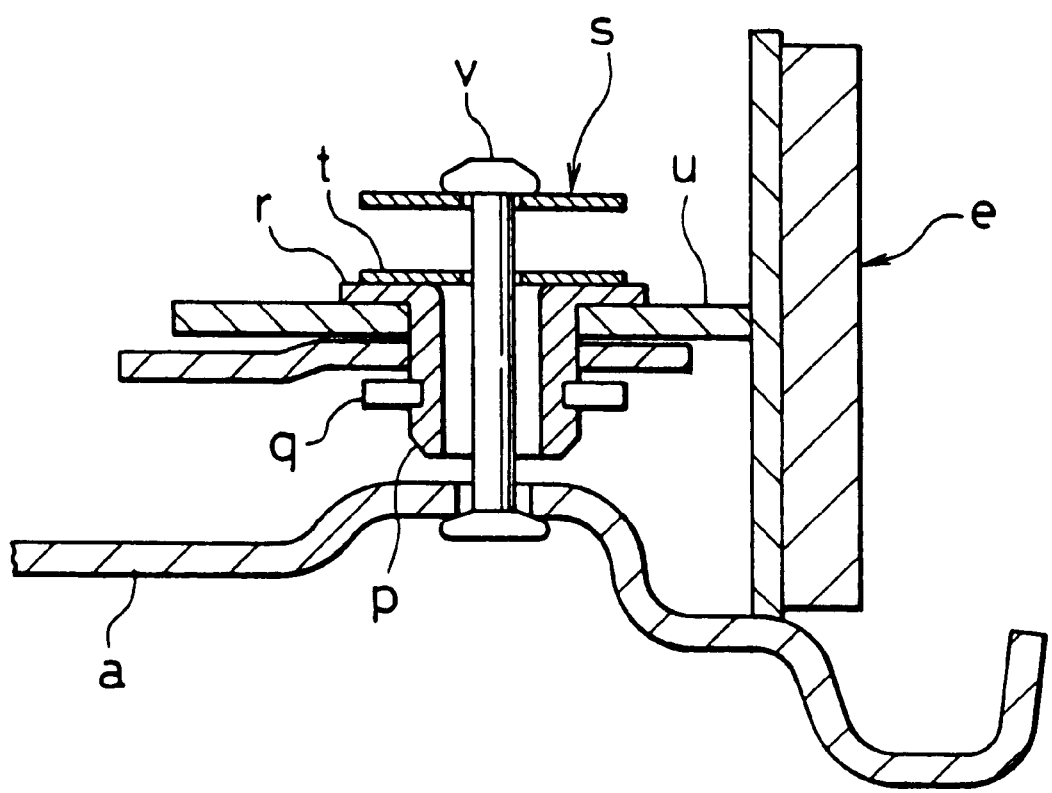
FIG. 21 is a cross section view of FIG. 20 taken along line A—A.

FIGS. 18–19 illustrate a modified version of the embodiment of Example 5, in which a mushroom-shaped long hole 57 is formed near the end of the shoe web 17 instead of the notched groove.

The long hole 57 is comprised of a large-diameter segment 57a through which the protuberance 54d of the pin 54 can pass, and a small-diameter segment 57b from which the protuberance 54d cannot be removed but through which the stem 54c can pass. To pre-assemble the device, the pin 54 is first inserted through the large-diameter segment 57a, then the brake shoe 13 and long link 44 are rotated relative to each other to guide the stem 54c of the pin 54 into the small-diameter segment 57b of the long hole 57.

As is evident from the above, this invention provides certain advantages.

An engagement means has been provided on the long link and the one brake shoe, which enables the former to be assembled onto the latter without the addition of independent components as is the case for conventional devices. This reduces the number of components as well as the cost of the device.

The long link can be pre-mounted on the brake shoe simply by rotating it, and therefore such assembly does not require any tools.

The engagement mechanism has been provided in a position distant from the shoe hold mechanism, and therefore has no adverse effect on the holding forces of the two shoe hold mechanisms. In addition, this invention maintains the commonality of the two brake shoes, and required modifications have been minimized, with no special modification required for the backplate and shoe hold mechanism. The invention also prevents a chance of misassembling the device.

The long link need only be pre-mounted onto the one brake shoe, at which point a simple visual observation can ascertain whether the face of the one brake shoe and the face of the long link abutting and engaging with the shoe clearance adjustment device are aligned to basically form one face. This will confirm the proper assembly of the components.

Torque can be imparted to the long link with its pivoting point with the shoe web as the fulcrum simply by a proper setting of the center of gravity of the long link, whereby the long link can be maintained at a fixed position relative to the brake shoe without the need for any additional pressure on the long link. This facilitates the assembly of the shoe clearance adjustment device and the strut.

The configuration of this invention facilitates them assembly of the components and all other work in the two cases where the drum brake device is assembled. One is on the assembly line where the brake is assembled in the horizontal state, and the other is a repair or maintenance operation, when the back plate is already affixed to the vehicle and components must be replaced or otherwise manipulated.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A drum brake device comprising:

a back plate;

two brake shoes set to face each other on top of said back plate;

a service brake actuator activated by a service brake mounted on said back plate between one pair of adjacent ends of said brake shoes;

an anchor mounted on said back plate between a second pair of adjacent ends of said brake shoes;

a shoe clearance adjustment device provided adjacent to said service brake actuator and provided between said brake shoes;

a parking brake actuator activated by a parking brake provided adjacent to said anchor; and a long link having a central segment pivotally mounted at a pivot point on a middle segment of one brake shoe and one end of said link and another end of said link respectively and functionally engaged with said shoe clearance adjustment device and the parking brake actuator, wherein an engagement means is provided between said long link and said one brake shoe such that said long link and said one brake shoe are superimposable and detachable, and said engagement means includes an engagement hook protruding from one of either said long link and said one brake shoe and a notched groove is formed in a remaining one of said long link and said one brake shoe such that when said long link and said one brake shoe are rotated relative to each other with their central pivot member as the fulcrum, said long link and said one brake shoe remain superimposed and inseparable.

2. A drum rake device as claimed in claim 1 in which a protuberance is integrally formed by a press on one or the other of the central segment of said long link or the central segment of said one brake shoe, and a hole is bored in the central segment of the other, and said protuberance is pivotable inside said hole.

3. A drum brake device as claimed in claim 1, wherein said engagement hook has a front tip, a stem rotatable within said notched groove, and an overhanged segment of sufficient length to keep said long link and said one brake shoe superimposed and inseparable at said front tip.

4. A drum brake device as claimed in claim 3 in which the engagement hook protruding from one or the other of said long link or said one brake shoe is integrally formed with said one or the other.

5. A drum brake device as claimed in claim 3 in which the engagement hook protruding from one or the other of said long link or said one brake shoe is provided at a fixed position on the assembled brake body when it is rotated to the position at which it abuts an inner wall of said notched groove or hole.

6. A drum brake device comprising:

a back plate;

two brake shoes set to face each other on top of said back plate;

a service brake actuator activated by a service brake mounted on said back plate between one pair of adjacent ends of said brake shoes;

an anchor mounted on said back plate between a second pair of adjacent ends of said brake shoes;

a shoe clearance adjustment device provided adjacent to said service brake actuator and provided between said brake shoes;

a parking brake actuator activated by a parking brake provided adjacent to said anchor; and a long link having a central segment pivotally mounted at a pivot point on a central segment of one brake shoe and one end of said link and another end of said link respectively and functionally engaged with said shoe clearance adjustment device and the parking brake actuator, wherein a center of gravity of said long link is set by an engagement hook protruding from one of either said long link and said one brake shoe and one of either a notch and a groove is formed in a remaining one of said long link and said one brake shoe such that when said back plate is affixed to a non-rotating component of a vehicle body and said long link has been mounted onto said one brake shoe arranged on top of said back plate, a face of said one brake shoe and a face of said long link that abut and engage said shoe clearance adjustment device are aligned to virtually form one face.

7. A drum brake device as claimed in claim 6, wherein said engagement hook provides a regulating mechanism that regulates the rotation of said long link arising from a torque of said long link such that the face of the one brake shoe and the face of the long link that abut and engage with said shoe clearance adjustment device are aligned to virtually form one face.

\* \* \* \* \*

UNITED STATES PATENT AND TRADEMARK OFFICE
CERTIFICATE OF CORRECTION

PATENT NO. : 6,062,353
DATED : May 16, 2000
INVENTOR(S) : ASAI et al.

It is certified that error appears in the above-identified patent and that said Letters Patent is hereby corrected as shown below:

Column 1, line 18, please delete "F", and insert --OF--

Column 6, line 62, please delete "BACKPLATE", and insert --BACK PLATE--

Column 8, line 1, please delete "35" and insert --36--

Column 8, line 25, please insert a period "." in between 21 and Then

Column 9, line 34, please delete "ASIDE" and insert --A SIDE--

Column 10, line 16, please delete "2 3" and insert --23--

Signed and Sealed this

First Day of May, 2001

Attest:

NICHOLAS P. GODICI

Attesting Officer          Acting Director of the United States Patent and Trademark Office